United States Patent
Kaliski, Jr. et al.

(10) Patent No.: US 9,705,851 B2
(45) Date of Patent: Jul. 11, 2017

(54) EXTENDING DNSSEC TRUST CHAINS TO OBJECTS OUTSIDE THE DNS

(71) Applicant: VERISIGN, INC., Reston, VA (US)

(72) Inventors: Burton S. Kaliski, Jr., McLean, VA (US); Eric Osterweil, Fairfax, VA (US); Glen Wiley, Goochland, VA (US)

(73) Assignee: VERISIGN, INC., Reston, VA (US)

( * ) Notice: Subject to any disclaimer, the term of this patent is extended or adjusted under 35 U.S.C. 154(b) by 34 days.

(21) Appl. No.: 14/814,792

(22) Filed: Jul. 31, 2015

(65) Prior Publication Data

US 2017/0012943 A1    Jan. 12, 2017

Related U.S. Application Data

(60) Provisional application No. 62/189,066, filed on Jul. 6, 2015.

(51) Int. Cl.
*H04L 29/06* (2006.01)
*H04L 29/12* (2006.01)

(52) U.S. Cl.
CPC ...... *H04L 63/0428* (2013.01); *H04L 61/1511* (2013.01); *H04L 61/1552* (2013.01); *H04L 61/305* (2013.01); *H04L 67/42* (2013.01)

(58) Field of Classification Search
CPC . H04L 63/08; H04L 63/0283; H04L 63/0876; H04L 63/20; H04L 9/006; H04L 9/00
See application file for complete search history.

(56) References Cited

U.S. PATENT DOCUMENTS

| | | | |
|---|---|---|---|
| 2010/0036915 A1* | 2/2010 | Kim | H04L 29/12066 709/206 |
| 2012/0124369 A1* | 5/2012 | Amenedo | H04L 63/0823 713/156 |

\* cited by examiner

*Primary Examiner* — Edward Zee
(74) *Attorney, Agent, or Firm* — MH2 Technology Law Group, LLP

(57) ABSTRACT

The present invention generally relates to systems and methods for extending a chain of trust beyond the DNS. Some embodiments provide a verifier with the ability to validate a chain of trust starting with the trust anchor at the DNS root all the way to a service or object of interest outside the DNS.

50 Claims, 6 Drawing Sheets

EXTENDING DNSSEC TRUST CHAINS TO OBJECTS OUTSIDE THE DNS

CROSS-REFERENCE TO RELATED APPLICATION

The present application claims priority to and the benefit of U.S. Provisional Application No. 62/189,066 entitled "EXTENDING DNSSEC TRUST CHAINS TO OBJECTS OUTSIDE THE DNS" filed Jul. 6, 2015, the entirety of which is hereby incorporated by reference.

FIELD OF THE INVENTION

This invention relates generally to validating, authenticating, and/or ensuring the integrity of electronic objects using trust chains.

BACKGROUND OF THE INVENTION

A cryptographic hash (or simply "hash" or "fingerprint") is typically a function that can input any of a variety of computer-interpretable objects and output a fixed-size string, e.g., a hexadecimal number. Cryptographic hashes typically have other useful properties such as preimage resistance and collision resistance.

A digital signature, or simply "signature", is typically the result of applying a private key of an asymmetric cryptographic key pair to a computer-interpretable object. The corresponding public key is published or otherwise made available by the signing entity to the verifying party. The object may first be hashed as part of the signature process. A verifying party can verify the signature by applying the public key to the signature and comparing the result to the object or the hash of the object, depending on the scheme. If the comparison results in a match, then the signature is valid; otherwise it is invalid. Digital signatures typically confer authentication, non-repudiation, and object integrity.

A digital certificate, or simply "certificate", is typically a package that includes information identifying a public key (e.g., the key itself or a hash of the key), together with information identifying the owner of the key, and a digital signature of at least some of the package contents. The digital signature is produced (i.e., signed) by a trusted party, such as a certificate authority. A digital certificate provides any entity that trusts the party that signed the certificate with the ability to validate that the signed public key is indeed associated with the party identified in the certificate.

The Domain Name System (DNS) is a hierarchical distributed naming system for resources, such as those provided by computer servers, connected to the internet. It associates domain names to Internet Protocol (IP) addresses. The DNS thus allows computers and humans to access networked resources using names.

The DNS is organized into "zones", the basic unit of organization of authoritative name data for the DNS. The DNS relies on extensive delegation of such authority. In that respect, the term "child" refers to an entity of record to which a "parent" entity delegates name resolution authority for a domain, or portion thereof. The terms "parent" and "child" are also generally identified with the respective zones. The terms "parent" and "child" may also be applied to domain names, where the relationship is sequential (e.g., "example.com" is the parent domain of "_smimecert.example.com"). Ancestral and other relationships may be similarly defined. Note that, although DNS delegations follow the DNS hierarchy, they are not necessarily sequential. That is, a delegation may skip one or more levels in the hierarchy. For example, while the domain "example.com" may be the parent domain of the child domain "_smimecert.example.com", the domains may or may not be in the relationship of parent and child zone, depending on whether the entity of record for "example.com" has delegated authority to the entity of record for "_smimecert.example.com", or the entities are the same.

DNS Authentication of Named Entities (DANE) relies on the DNS Security Extensions (DNSSEC) to authenticate data within the DNS, such as public keys and digital certificates associated with domain names. However, by definition, DNSSEC and DANE cannot authenticate data outside of the DNS.

SUMMARY

According to some embodiments, a method of providing data is disclosed. The method includes receiving at a first DNS server, over an electronic computer network, a first DNS resource record request from a client computer, where the first DNS resource record request includes a first domain name; providing, by the first DNS server to the client computer and in response to the first DNS resource record request, a first DNS resource record including a URI for a non-DNS service; such that the client computer derives a target URI from the URI for the non-DNS service, contacts a non-DNS service at the target URI for requested data, and receives the requested data from the non-DNS service; receiving, at a second DNS server, over the electronic computer network, a second DNS resource record request from the client computer, the second DNS resource record request including a second domain name; and providing, by the second DNS server to the client computer and in response to the second DNS resource record request, a second DNS resource record including cryptographic authentication information corresponding to the second domain name; such that the client computer cryptographically validates the requested data using the cryptographic authentication information.

Various optional features of the above method embodiments include the following. The method may include receiving at a third DNS server, prior to the receiving at the first DNS server, over an electronic computer network, a third DNS resource record request from a client computer, the third DNS resource record request including a third domain name; and replying to the client computer that the third DNS resource record request corresponds to a non-existent record, such that resolution logic consequently directs the client computer to send the first DNS resource record request. The third DNS server may be the first DNS server. The second DNS server may be the third DNS server. The second DNS server may be the first DNS server. The cryptographic authentication information may include a public key of an asymmetric cryptographic key pair, where the requested data is signed by a private key of the cryptographic key pair. The cryptographic authentication information may further include a digital certificate including the public key. The cryptographic authentication information may include a digital certificate in a trust chain that includes a public key of an asymmetric cryptographic key pair, where the requested data is signed by a private key of the cryptographic key pair. The requested data may be signed by a private key of an asymmetric cryptographic key pair including a public key, and the cryptographic authentication information may include a cryptographic hash of at least one of: the public key, a digital certificate including the public key, or a digital certificate in a trust chain that includes the public key. The cryptographic authentication information may include a cryptographic hash of the requested data. The non-DNS service may obtain an identifier corresponding to a user of the client computer, such that the non-DNS service selects the requested data based at least in part on the identifier corresponding to the user of the client computer. The second DNS resource record may be one of a plurality of DNS resource records provided by the by the second DNS server to the client computer in response to the second DNS resource record request; such that the client computer selects the second DNS resource record from the plurality of DNS resource records based on at least one of the requested data or an identifier corresponding to a user of the client computer. The method may include selecting, by the second DNS server, the second DNS resource record from a plurality of DNS resource records based on at least one of the requested data or an identifier corresponding to a user of the client computer.

According to some embodiments, a system for providing data is disclosed. The system includes a first DNS server configured to: receive, over an electronic computer network, a first DNS resource record request from the client computer, where the first DNS resource record request includes a first domain name; and provide, to the client computer and in response to the first DNS resource record request, a first DNS resource record including a URI for a non-DNS service; such that the client computer derives a target URI from the URI for the non-DNS service, contacts a non-DNS service at the target URI for requested data, and receives the requested data from the non-DNS service; and a second DNS server communicatively coupled to the first DNS server, the second DNS server configured to: receive, over the electronic computer network, a second DNS resource record request from the client computer, the second DNS resource record request including a second domain name; and provide, to the client computer and in response to the second DNS resource record request, a second DNS resource record including cryptographic authentication information corresponding to the second domain name; such that the client computer cryptographically validates the requested data using the cryptographic authentication information.

Various optional features of the above system embodiments include the following. The system may include a third DNS server configured to: receive, prior to the first DNS server receiving the first resource record request, over an electronic computer network, a third DNS resource record request from a client computer, the third DNS resource record request including a third domain name; determine that the third DNS resource record request corresponds to a non-existent record; and reply to the client computer that the third DNS resource record request corresponds to a non-existent record, such that resolution logic consequently directs the client computer to send the first DNS resource record request. The third DNS server may be the first DNS server. The second DNS server may be the third DNS server. The second DNS server may be the first DNS server. The cryptographic authentication information may include a public key of an asymmetric cryptographic key pair, where the requested data is signed by a private key of the cryptographic key pair. The cryptographic authentication information may further include a digital certificate including the public key. The cryptographic authentication information may include a digital certificate in a trust chain that includes a public key of an asymmetric cryptographic key pair, where the requested data is signed by a private key of the cryptographic key pair. The requested data may be signed by a private key of an asymmetric cryptographic key pair including a public key, and the cryptographic authentication information may include a cryptographic hash of at least one of: the public key, a digital certificate including the public key, or a digital certificate in a trust chain that includes the public key. The cryptographic authentication information may include a cryptographic hash of the requested data. The non-DNS service may obtain an identifier corresponding to a user of the client computer, such that the non-DNS service selects the requested data based at least in part on the identifier corresponding to the user of the client computer. The second DNS server may be configured to provide a plurality of DNS resource records including the second DNS resource record to the client computer in response to the second DNS resource record request; such that the client computer selects the second DNS resource record from the plurality of DNS resource records based on at least one of the requested data or an identifier corresponding to a user of the client computer. The second DNS server may be configured to select the second DNS resource record from a plurality of DNS resource records based on at least one of the requested data or an identifier corresponding to a user of the client computer.

According to some embodiments, a method of obtaining data is disclosed. The method includes sending, from a client computer and over an electronic computer network, a first DNS resource record request to a first DNS server, where the first DNS resource record request includes a first domain name; receiving, by the client computer, a first DNS resource record sent from the first DNS server in response to the first DNS resource record request, the first DNS resource record including a URI for a non-DNS service; deriving, by the client computer, a target URI from the URI for the non-DNS service; contacting, by the client computer and over the electronic computer network, the non-DNS service at the target URI for requested data; receiving, by the client computer and over the electronic computer network, the requested data from the non-DNS service; sending, by the client computer and over the electronic network, a second DNS resource record request to a second DNS server, the second DNS resource record request including a second domain name; receiving, by the client computer, a second DNS resource record sent from the second DNS server in response to the second DNS resource record request, the second DNS resource record including cryptographic authentication information corresponding to the second domain name; and cryptographically validating the requested data using the cryptographic authentication information.

Various optional features of the above method embodiments include the following. The method may include sending, prior to the sending the first DNS resource record request, from the client computer and over the electronic computer network, a third DNS resource record request to a third DNS server, the third DNS resource record request including a third domain name; and receiving, by the client computer, an indication sent by the third DNS server that the third resource record request corresponds to a non-existent record, where resolution logic consequently directs the client computer to perform the sending the first DNS resource record request. The third DNS server may be the first DNS server. The second DNS server may be the third DNS server. The second DNS server may be the first DNS server. The cryptographic authentication information may include a public key of an asymmetric cryptographic key pair, where the requested data is signed by a private key of the cryptographic key pair. The cryptographic authentication information may further include a digital certificate including the public key. The cryptographic authentication information may include a digital certificate in a trust chain that includes a public key of an asymmetric cryptographic key pair, where the requested data is signed by a private key of the cryptographic key pair. The requested data may be signed by a private key of an asymmetric cryptographic key pair including a public key, and the cryptographic authentication information may include a cryptographic hash of at least one of: the public key, a digital certificate including the public key, or a digital certificate in a trust chain that includes the public key. The cryptographic authentication information may include a cryptographic hash of the requested data. The contacting the non-DNS service may include sending an identifier corresponding to a user of the client computer, such that the non-DNS service selects the requested data based at least in part on the identifier corresponding to the user of the client computer. The second DNS resource record may be one of a plurality of DNS resource records provided by the by the second DNS server to the client computer in response to the second DNS resource record request, and the method may further include: selecting, by the client computer, the second DNS resource record from the plurality of DNS resource records based on at least one of the requested data or an identifier corresponding to a user of the client computer. The sending a second DNS resource record request may include sending an identifier corresponding to a user of the client computer; such that the second DNS server selects the second DNS resource record from a plurality of DNS resource records based on at least one of the requested data or the identifier corresponding to the user of the client computer.

According to some embodiments, a non-transitory computer readable medium including computer-interpretable instructions, which, when executed by at least one electronic processor of a client computer, configure the at least one electronic processor to perform a method is disclosed. The performed method includes sending, from the client computer and over an electronic computer network, a first DNS resource record request to a first DNS server, where the first DNS resource record request includes a first domain name; receiving, by the client computer, a first DNS resource record sent from the first DNS server in response to the first DNS resource record request, the first DNS resource record including a URI for a non-DNS service; deriving, by the client computer, a target URI from the URI for the non-DNS service; contacting, by the client computer and over the electronic computer network, the non-DNS service at the target URI for requested data; receiving, by the client computer and over the electronic computer network, the requested data from the non-DNS service; sending, by the client computer and over the electronic network, a second DNS resource record request to a second DNS server, the second DNS resource record request including a second domain name; receiving, by the client computer, a second DNS resource record sent from the second DNS server in response to the second DNS resource record request, the second DNS resource record including cryptographic authentication information corresponding to the second domain name; and cryptographically validating the requested data using the cryptographic authentication information.

Various optional features of the above computer readable medium embodiments include the following. The non-transitory computer readable medium may further include computer-interpretable instructions, which, when executed by the at least one electronic processor of the client computer, further configure the at least one electronic processor to perform: sending, prior to the sending the first DNS resource record request, from the client computer and over the electronic computer network, a third DNS resource record request to a third DNS server, the third DNS resource record request including a third domain name; and receiving, by the client computer, an indication sent by the third DNS server that the third resource record request corresponds to a non-existent record, where resolution logic consequently directs the client computer to perform the sending the first DNS resource record request. The third DNS server may be the first DNS server. The second DNS server may be the third DNS server. The second DNS server may be the first DNS server. The cryptographic authentication information may include a public key of an asymmetric cryptographic key pair, where the requested data is signed by a private key of the cryptographic key pair. The cryptographic authentication information may further include a digital certificate including the public key. The cryptographic authentication information may include a digital certificate in a trust chain that includes a public key of an asymmetric cryptographic key pair, where the requested data is signed by a private key of the cryptographic key pair. The requested data may be signed by a private key of an asymmetric cryptographic key pair including a public key, and the cryptographic authentication information may include a cryptographic hash of at least one of: the public key, a digital certificate including the public key, or a digital certificate in a trust chain that includes the public key. The cryptographic authentication information may include a cryptographic hash of the requested data. The contacting the non-DNS service may include sending an identifier corresponding to a user of the client computer, such that the non-DNS service selects the requested data based at least in part on the identifier corresponding to the user of the client computer. The second DNS resource record may be one of a plurality of DNS resource records provided by the by the second DNS server to the client computer in response to the second DNS resource record request, and the non-transitory computer readable medium may further include computer-interpretable instructions, which, when executed by the at least one electronic processor of the client computer, further configure the at least one electronic processor to select the second DNS resource record from the plurality of DNS resource records based on at least one of the requested data or an identifier corresponding to a user of the client computer. The sending a second DNS resource record request may include sending an identifier corresponding to a user of the client computer, such that the second DNS server selects the second DNS resource record from a plurality of DNS resource records based on at least one of the requested data or the identifier corresponding to the user of the client computer.

Computer readable media, system, and method claims are contemplated for all embodiments disclosed herein.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
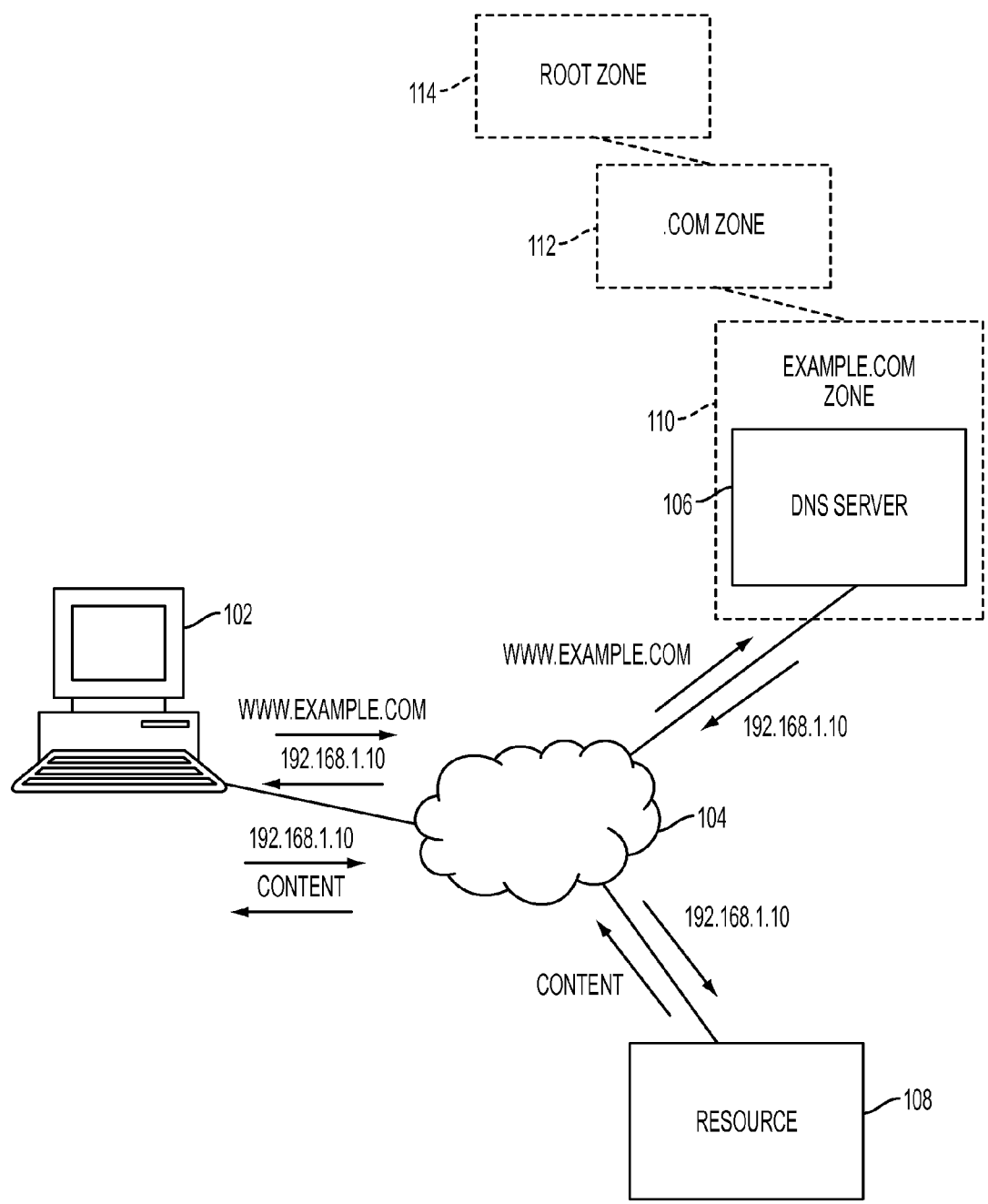
FIG. 1 is a schematic diagram depicting an example DNS interaction with a client.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

I. Overview

Some embodiments provide techniques for extending the chains of trust established via DNSSEC and DANE to provide and authenticate non-DNS services and objects delivered by non-DNS services. That is, some embodiments address two problems: how to locate a non-DNS service, and how to validate the object returned by the non-DNS service. Non-limiting examples of non-DNS services include certificate authorities, Active Directory Certificate Services (AD CS), Lightweight Directory Access Protocol (LDAP) instances, and key servers. Non-limiting example objects include public keys (of an asymmetric cryptographic key pair), certificates, and payment information.

To extend trust chains and provide for object validation, some embodiments include one or more of the following: a particular type of parameterization of uniform resource identifiers (URIs), a new DNS resource record type, referred to as "URIVAL", short for "URI validation", used to validate objects associated with URIs, and resolution logic, used to locate and process URIs and/or URIVAL records. Short introductions to these features follow immediately below, after which detailed descriptions are presented.

The following provides a brief description of parameterization according to some embodiments. Computers may locate data using the DNS by way of queries directed at a domain name. In contrast, data in non-DNS services may be located via Uniform Resource Identifiers (URIs) rather than strict domain names. Although it is technically possible to point from the DNS to a non-DNS service by publishing a URI as a DNS record, such a pointer would then be associated with only the specific domain name. If the non-DNS service has information about additional domain names as well, then additional URIs would also be published in the DNS for each domain name, multiplying complexity. Some embodiments overcome this problem by providing a zone-level URI that is published for an entire zone (and potentially encompassing sub-zones as well). The URI associated with a domain name within the zone may then be derived by parameterizing (e.g., modifying by adding parameters) the zone-level URI, e.g., with the specific domain name, according to resolution logic associated with the URI's schema. For example, the leftmost labels of a fully qualified domain name (FQDN) could be appended to the zone-level URI to derive a parameterized URI that is sent to the non-DNS service, which may then respond with data particular to the FQDN. The base URI may be published in its own DNS resource record, or as part of another resource record, e.g., an extension of the current Transport Layer Security Association (TLSA) or Secure/Multipurpose Internet Mail Extensions Association (SMIMEA) record.

The new URIVAL DNS resource record provides a way of publishing cryptographic information that can be used to authenticate objects returned by non-DNS services. A URIVAL record may include a dedicated validation field for the cryptographic information. Such cryptographic information may include a public key for verifying digital signatures on the objects, a related digital certificate, or a hash or fingerprint of such values. Embodiments may include the prescribed use of multiple concurrent URIVAL records for a domain name and/or its parent (or other related) domain to accommodate changes in digital signature keys over time, as well as the possibility that multiple digital signature keys are employed by the non-DNS service at the same time to authenticate the same or different objects, e.g., based on varying policy requirements. The URIVAL resource record may also indicate those policy requirements. Although referred to as a new resource record with the name "URIVAL", the specific name itself is not essential to the invention. Moreover, the cryptographic information can be published in its own resource record or as part of another resource record.

Resolution logic may be used by a relying party to locate and process the URI and/or URIVAL or similar records related to a given domain name. If the domain name does not have an associated URI and/or URIVAL or similar record, the search logic may continue upward to a parent domain of the domain name, and/or to other related domain names. If a URI record is located there, then the URI may be parameterized, e.g., by modifying it to include specific parameters. A URIVAL record may be published in a parent domain of a domain name and/or other related domain names, and may be used to authenticate data returned by the non-DNS service associated with the domain name. This has the advantage that a single set of URI and/or URIVAL records can cover an entire DNS zone, thus reducing the number of DNS records, while still allowing individual domain names to have their own URI and/or URIVAL or similar records if desired. The Public Suffix List or similar approaches may be used in the logic to bound the upward search for parent and/or other related domains, and to ensure that the URI and/or URIVAL records only cover domain names within appropriate administrative boundaries. Note that the resolution logic may be present in any of a variety of computers, e.g., part of a Mail User Agent (MUA).

FIG. 1 is a schematic diagram depicting, by way of background, an example DNS interaction. Note that the interaction depicted by FIG. 1 does not necessarily involve an embodiment of the invention, nor does it explicitly depict validation or authentication mechanisms. Instead, FIG. 1 depicts an overview of one example of how DNS enables the internet to operate using domain names instead of numerical internet protocol (IP) addresses. That is, although networked computers generally rely on numerical locators such as IP addresses, human beings are ill-equipped to memorize such locators. Accordingly, DNS enables humans to rely on easy-to-remember domain names to access resources and data.

A user may operate client computer 102. The user may enter a domain name, e.g., www.example.com, in the navigation field of a web browser executing on client computer 102. Client computer 102 operates and/or contacts a recursive DNS server (not shown) to look up the IP address corresponding to www.example.com. In particular, client computer 102 may send a resource record query to the recursive DNS server (not shown). For purposes of this example, the recursive DNS server lacks a resource record for www.example.com. According to the DNS protocol, the recursive DNS server may in this example query the root zone 114 for this record. By way of a DNS name server (NS) resource record, the root server points to a DNS server for .com zone 112, which provides an NS record that points to DNS server 106 for the zone for www.example.com, again, relying on an NS resource record. DNS server 106 responds with an appropriate DNS record (e.g., A or AAAA) that includes the requested IP address. Client computer 106 receives the resource record and parses it to extract the IP address. Client computer then contacts the IP address, which leads to resource 108, which may be a server computer. Resource 108 responds with the requested data, e.g., content.

Standing alone, the DNS protocol originally did not include any authentication mechanism for checking the validity of data sent between and from DNS servers. That is, as originally designed, DNS did not include authentication and was therefore exposed to, for example, spoofing and man-in-the-middle attacks. Accordingly, DNS benefits from security provided by the DNS security (DNSSEC) standard, which utilizes trust chains.

II. Trust Chains for Object within the DNS

In general, a trust chain includes a directed series of trust nodes, each of which authenticates the following node in the chain. The first node in a trust chain may be authenticated by an external trust anchor. The last node may be an object that itself does not authenticate anything else, e.g., it may be a key used for encryption rather than signing, or a general-purpose object. The nodes may be implemented as computer-interpretable, electronically stored records that include authentication information, such as a digital signature, public key, digital certificate, or hash (e.g., DNSKEY, DS, and/or RRSIG records). A trust chain that includes only digital certificates may be referred to as a "digital certificate chain". A relying party who trusts only the trust anchor can authenticate every node in the chain, including an object at the end.

Trust chains are important not only because they provide straightforward, scalable ways for an application to authenticate information throughout a trust hierarchy, but also because they are transferrable. An application or relying party can forward a trust chain to another relying party, who can then authenticate the same information itself without further interaction with other services.

A DNSSEC trust chain starts with a DNSSEC root public key and extends through the DNS hierarchy via a series of digital signatures on DNS records or specific hashes of public keys. The links between nodes within a DNSSEC trust chain take the form of either a public key in one node with a signature by the corresponding private key on the next, or a hash of a public key in one node with the corresponding public key in the next. That is, the records in a DNSSEC trust chain include either public keys for verifying digital signatures on subsequent records, or hashes of public keys of subsequent records. In the former case, a node may be authenticated by verifying its digital signature with a prior node's public key. In the latter case, the node may be authenticated by comparing the hash of its content with a prior node's value.

Figure 2:
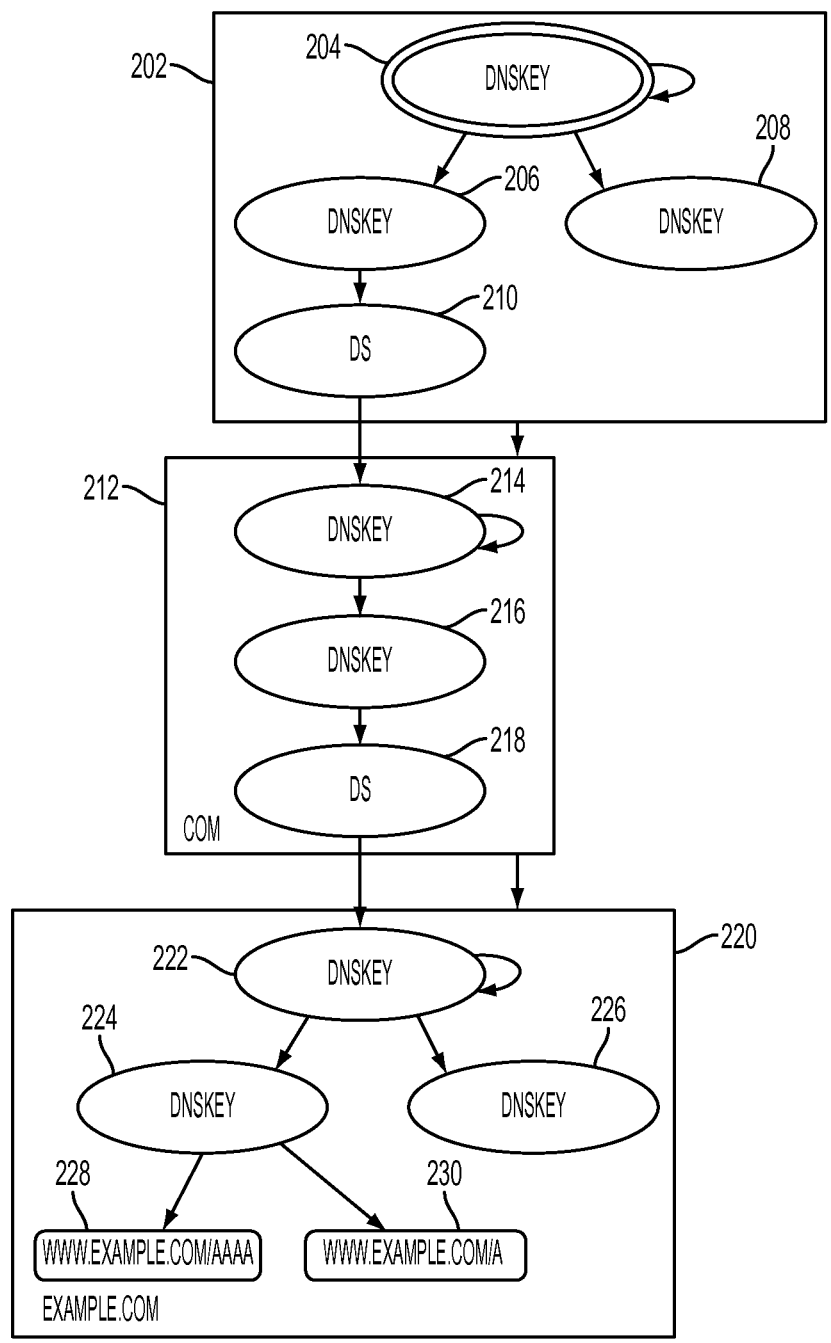
FIG. 2 is a schematic diagram of a trust chain authenticating only objects within the DNS.

FIG. 2 is a schematic diagram of a DNSSEC trust chain, which authenticates only objects within the DNS. The DNSSEC trust chains in this diagram have a length of nine nodes shown in three groups 202, 212, 220, which correspond to zones 114, 112, 110 of FIG. 1. The nodes 204, 206, 208, and 210 are for the root zone group 202 (records 206 and 208 are alternative second nodes). The first DNSKEY record 204 is for the root zone's key-signing key (KSK). This KSK also forms part of the external trust anchor. The DNSKEY records 206, 208 are for the root zone's zone-signing keys (ZSKs), which are signed by the private key corresponding to the KSK. In the example, only 206 continues as part of the trust chain. A separate trust chain may be continued from 208. The third node 210 in this group includes the delegation signer (DS) record for the .com zone's KSK. It is signed by the private key corresponding to the root zone's ZSK, and contains the hash of the .com zone's KSK (see 214, below).

The next group of nodes extends the same pattern to the .com zone group 202. Thus, KSK record 214 authenticates ZSK record 216 via a digital signature, ZSK record 216 authenticates DS record 218 for example.com via a digital signature, and DS record 218 authenticates the KSK in the next group 220 by including a hash value of the KSK of the next record 222.

The last group of nodes, for the example.com zone group 220, starts with the KSK-to-ZSK pattern (222, 224, 226) and concludes with a ZSK-to-object pattern (224, 228, 230) where the ZSK record 224 authenticates the last node (228, 230) with a digital signature. The last node (228, 230) includes AAAA record 228 and A record 230 for www.example.com. Each is authenticated via a digital signature by the private key corresponding to the example.com zone's ZSK (of record 224). There are thus two trust chains of length nine nodes, one from 204 to 228, and the other from 204 to 230. Both begin with the trust chain of length eight nodes from 204 to 224.

Note that FIG. 2 reflects only a portion of the DNS records that would be present in practice. For example, not shown in FIG. 2 are the name server (NS) records that point to the name server for a zone. In practice, these are also signed by the ZSK for the zone. They are not part of the trust chain from the trust anchor to the object, but are instead part of the trust chain to the name server where the DNS records corresponding to other nodes, including the object, is obtained. Further, FIG. 2 does not show the full array of domains within each zone.

The DNSSEC trust chain is limited, by definition, to authenticating objects published in the DNS. In contrast, objects delivered by non-DNS services are not part of this trust chain and cannot be directly authenticated by it. Because the DNSSEC trust chain is limited to objects published in the DNS, an application can only transfer trust via such a chain for objects published in the DNS, but not for objects published in non-DNS services. Some embodiments extend the trust chains to include objects delivered by non-DNS services.

III. URIVAL Records & Trust Chains for Objects Outside the DNS

URIVAL records are a new type of DNS record that include validation information by which objects identified by a URI and delivered by a non-DNS service may be authenticated. The validation information in a URIVAL record may take any of several forms, for example, any of the following:

- A public key, where the object is signed by the corresponding private key of an asymmetric cryptographic scheme.
- A digital certificate related to the public key referred to immediately above, e.g., a certificate containing the public key, or a certificate that appears in a digital certificate chain (see related description introducing FIG. 2 above) that includes the public key.
- A cryptographic hash of any of the above items.
- A cryptographic hash of the object itself.
- A key identifier for a public key, or a certificate identifier for a certificate.

The validation information of a URIVAL record may link a node in a DNSSEC trust chain to an object returned by a non-DNS service.

A URIVAL record can also be used in conjunction with modified versions of the TLSA, SMIMEA, and other DANE records, where a URI is published in a DANE record as an alternative to including the value of the object of interest in the DANE record. The data used to validate the response may be published in an associated URIVAL record.

Figure 3:
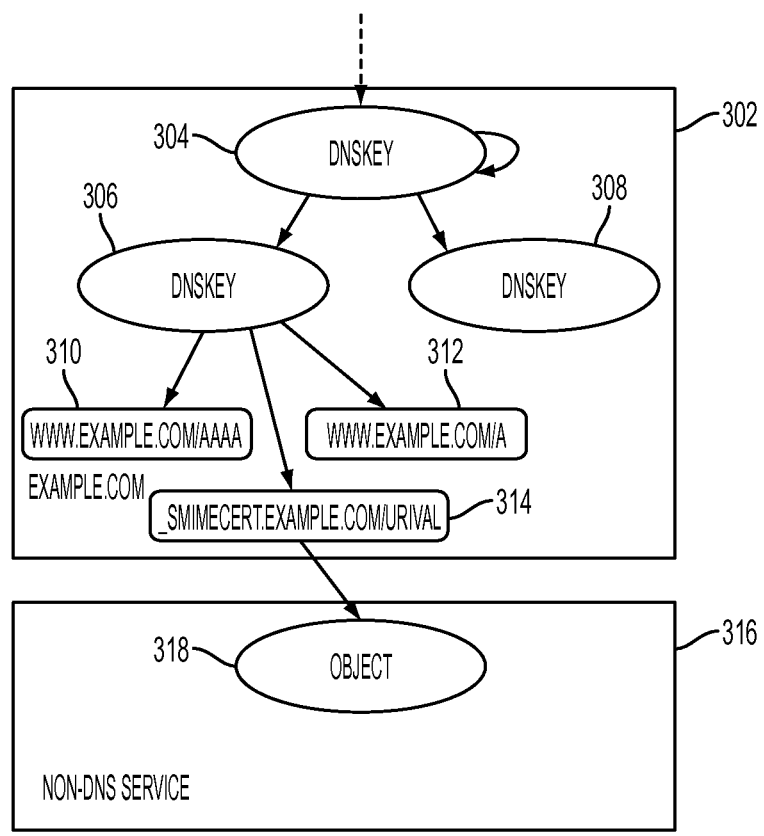
FIG. 3 is a schematic diagram of a portion of a trust chain authenticating an object outside of the DNS.

FIG. 3 is a schematic diagram of a portion of a trust chain authenticating an object outside of the DNS. Group 302 corresponds to group 220 of FIG. 2; node 304 corresponds to node 222; nodes 306 and 308 correspond to the nodes 224 and 226; and nodes 310 and 312 correspond to nodes 228 and 230, respectively. In other words, the trust chain portion depicted in FIG. 3 extends the trust chain depicted in FIG. 2.

However, FIG. 3 depicts two new links added to the trust chain of FIG. 2. First, URIVAL record 314 is authenticated with a digital signature by the ZSK record 306 for example-.com, similar to other objects published in that zone. URIVAL record 314 is associated with the _smimecert.example-.com domain name for purposes of illustration, but may be published at a different domain name. Second, object 318 in non-DNS service 316 is authenticated by URIVAL record 314 as described above. These objects and their relations extend the trust chain outside the DNS.

Note that, as in the DNSSEC trust chain of FIG. 2, the arrows in FIG. 3 indicate trust relationships, not the location of objects or services. Object 318 in non-DNS service 316 may be pointed to by a URI, possibly one that is parameterized (see FIG. 5 and associated description).

A URIVAL resource record may be published alongside a URI record or another DNS record containing a URI, i.e., at the same domain name. The URIVAL record would thus indicate that the object returned by the service that the URI points to may be authenticated via the validation information in the URIVAL record.

A URIVAL record may alternately be published above the URI record, e.g., at a parent domain of the domain name. For instance, the URI may be published at <hash-of-bob>._smimecert.example.com, and the URIVAL published at the parent domain, _smimecert.example.com. This provides a more efficient means of publication and look up when the validation information is the same for multiple domain names under the same parent domain. A URIVAL record may also be published at an ancestor domain of the parent. As another alternative, a URIVAL record may be published at a related domain under a parent or ancestor, e.g., at a domain adjacent to the parent, such as _urival.example.com. Corresponding resolution logic may be utilized to locate URIVAL records situated as described.

Note that the object that a URI points to may change over time; therefore the way that it is authenticated may also change according to some embodiments. In the case that the URI is parameterized, see FIG. 5 and associated description, the multiple objects pointed to by the various parameterized URIs may each be authenticated in different ways. In addition, when the URIVAL record is published at a parent domain and covers multiple URI records at child domain names under the parent domain, the different objects corresponding to the URIs associated with the child domain names may involve different validation information. Indeed, the different child-derived URIs may even involve different non-DNS services, each with different public keys.

For these reasons, among others, some embodiments include multiple published URIVAL records to indicate the various possible ways that objects from the non-DNS service may be authenticated at the current time and over time. These ways may involve different cryptographic algorithms, public keys, and/or certificates. The plurality of URIVAL records helps ensure that a relying party has a sufficiently broad set of potential links between the DNSSEC trust chain and external objects.

In addition, or as an alternative, to the URIVAL records described herein, the validation information of a URIVAL record may be published as a field of another DNS record, or as a compound field with the URI. The URI could also be constructed in such a way that the URI itself includes the validation information, e.g., the URI encodes the hash of the object it points to, or the hash of a public key by which a signature on the object may be authenticated. This approach may be convenient if there is just one instance of validation information for a given URI.

IV. Example Use Cases

In a typical application of the techniques described herein, a relying party is looking for an object of a certain type, e.g., a user's email digital certificate. The relying party, via a client application and/or an intermediate service such as a DNS resolver, may send a query to the DNS requesting a resource record for a certain domain name. If the object of interest is not published in the DNS but is instead pointed to by the DNS via a URI, then the relying party may validate the object by the extended trust chain described herein. That is, in order to validate the object, the relying party looks up the associated URIVAL records. As noted above, these may be published alongside, above, in an ancestor to a parent domain, or otherwise in a way related to the DNS record containing the URI.

An application, e.g., an MUA or web browser, may employ resolution logic to ensure proper validation. To locate an object of interest served by a non-DNS service, the resolution logic may move through the DNS hierarchy as needed. The resolution logic may look first at a domain name, e.g., <hash-of-bob>._smimecert.example.com, for a URI (e.g., as described in reference to FIGS. 4-6, below). That is, the resolution logic may send out a DNS server query for the stated domain for a resource record of a particular type, e.g., SMIMEA. Then, if the server does not find a match to the query (e.g., as described and shown in reference to FIG. 5), the resolution logic may direct a DNS query for the parent domain name, e.g., _smimecert.example.com, (or above, or another related domain name, e.g., _uri.example.com) for a URI that may then be parameterized as described herein.

Another possibility is for the resolution logic to look first at the parent or another related domain name for a URI that would be then be parameterized, i.e., starting directly at _smimecert.example.com without first looking at <hash-ofbob>._smimecert.example.com. This would have the advantage of saving a step, but the disadvantage of overlooking any specific choice that may have been published at the child domain name, unless after no match is found at the parent or other related domain name, the child domain name is searched next.

To validate the located object, the resolution logic may next send a DNS query for a URIVAL record at the same domain name where the URI was found, and, if it is not found, then look at the domain above (e.g., _smimecert.example.com), or at another related domain name (e.g., urival.example.com) if needed. In such cases, the resolution logic may direct appropriate validation. In some embodiments the resolution logic could start back at the child to query for the URIVAL record, even if the URI were itself obtained above.

A name server may facilitate the resolution logic by returning additional records in its response that it expects will be requested next, e.g., returning the associated URIVAL record along with the URI, when just the URI is requested, and/or looking at the parent or other related domain names for records likely to be requested next.

The URI and/or URIVAL records may be scoped by policy only to cover domain names within the same administrative boundaries, i.e., zones. The Public Suffix List or similar approaches may be used in the logic to bound the upward search for parent or other related domains for this purpose.

Figure 4:
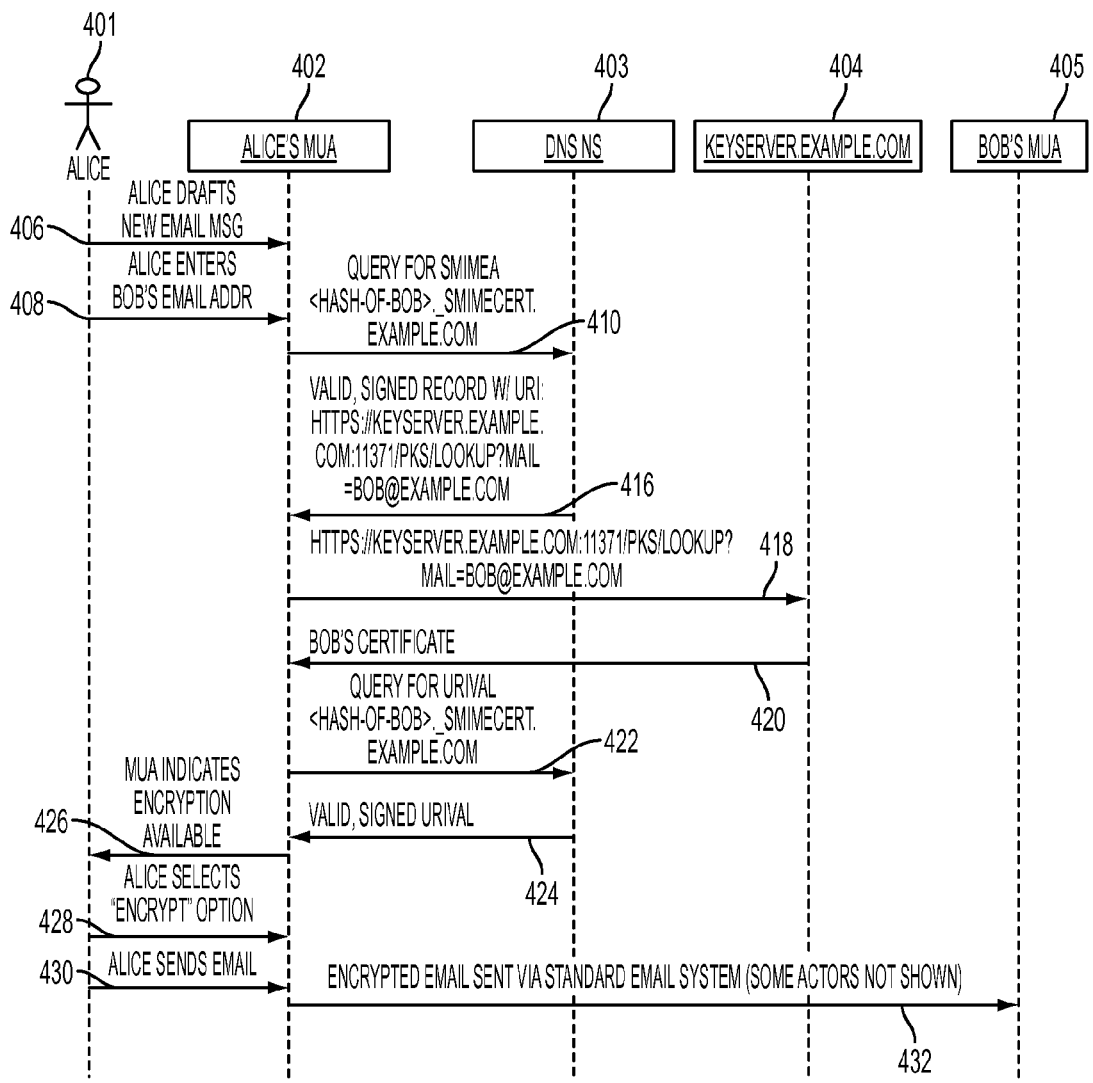
FIG. 4 is a schematic diagram depicting a method without parameterization according to some embodiments.
Figure 5:
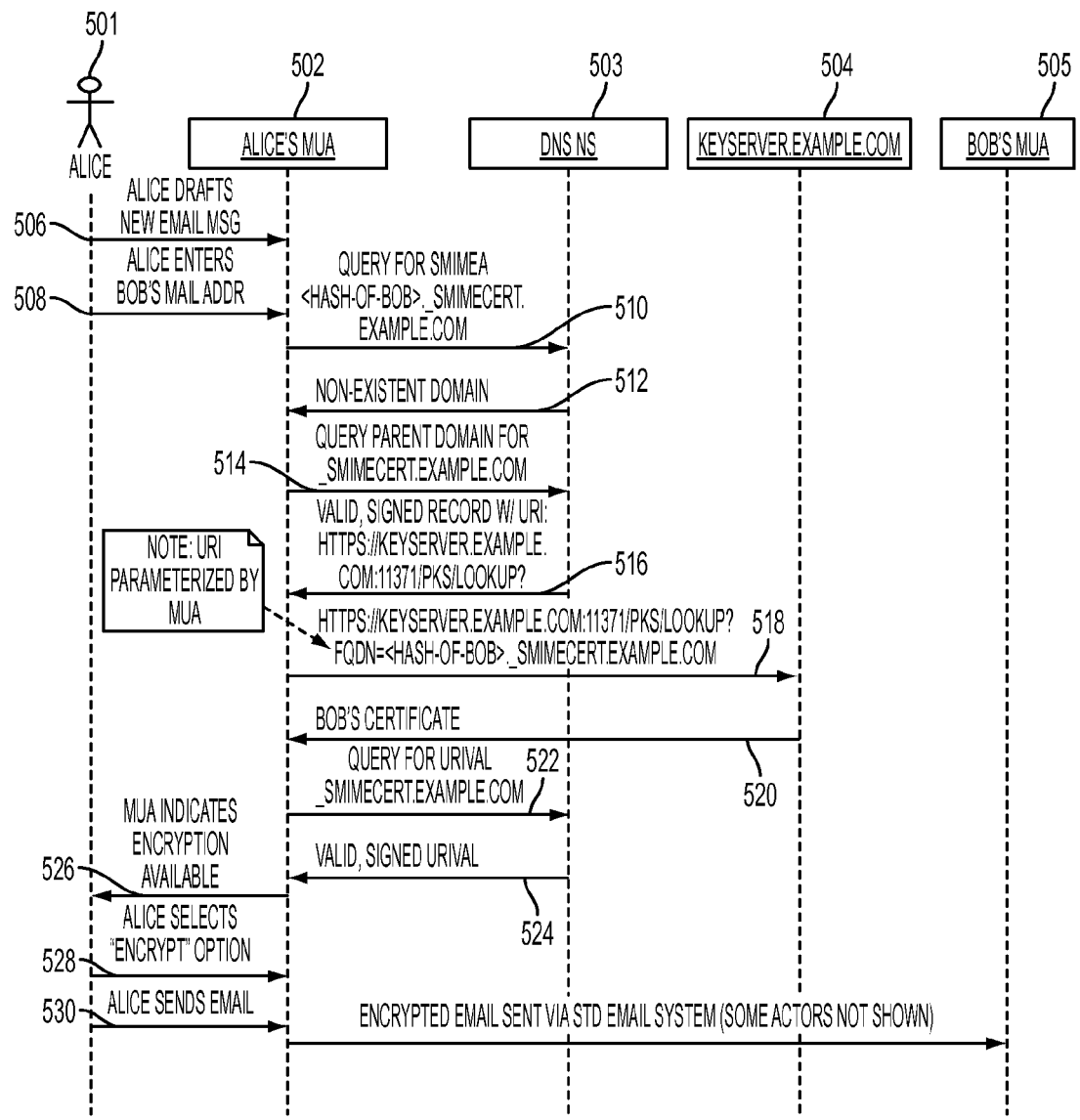
FIG. 5 is a schematic diagram depicting a method that utilizes parameterization according to some embodiments.
Figure 6:
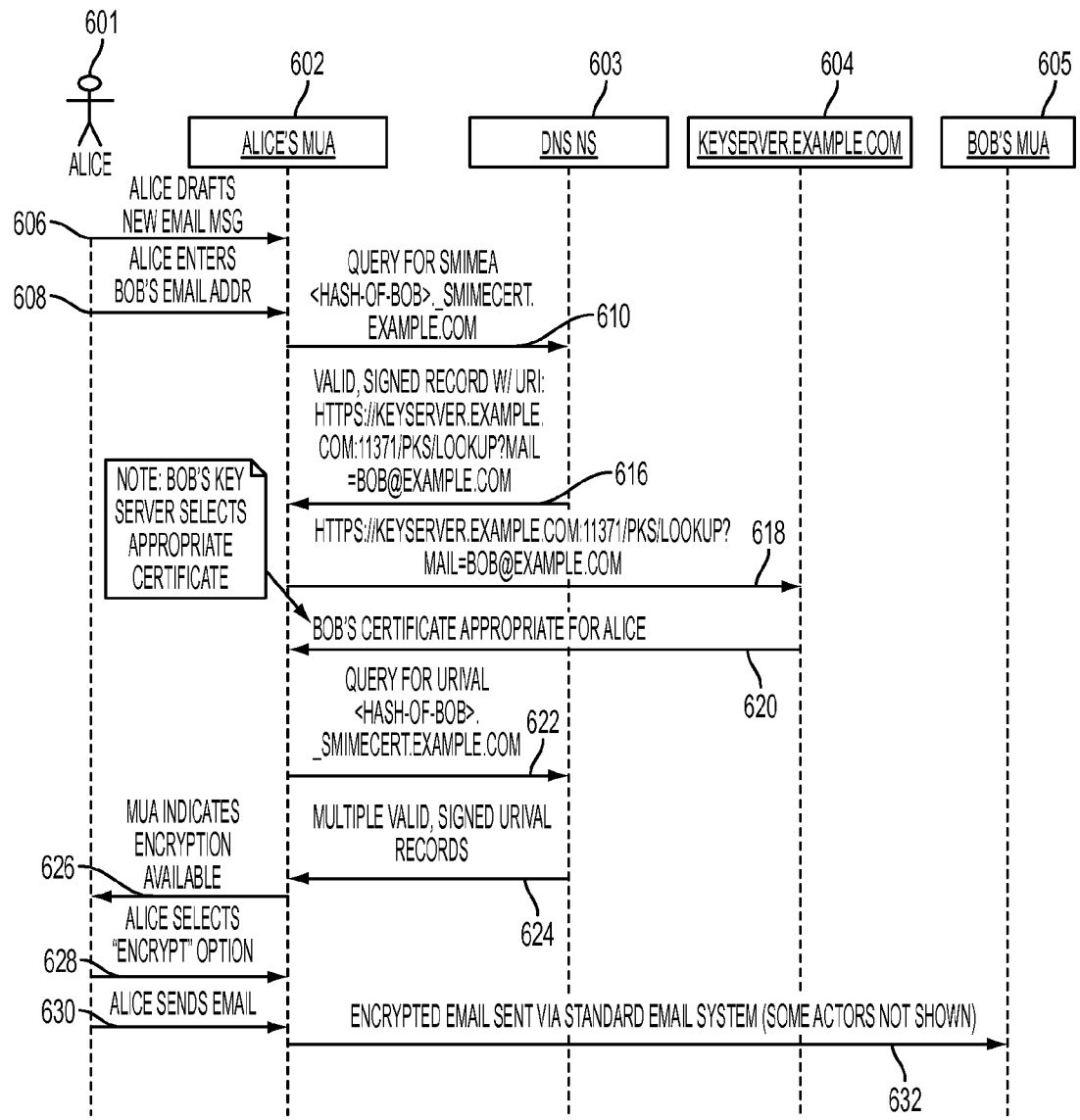
FIG. 6 is a schematic diagram depicting a method with multiple concurrent URIVAL records according to some embodiments.

Note that features of the use cases illustrated and described in reference to FIGS. 4-6 may be combined in various ways. That is, the use cases present specific instances of, for example, extending trust chains outside of DNS, URI parameterization, the use of multiple URIVAL records, and the disclosed resolution logic. However, the example use cases are non-limiting, and these features may be arranged in a manner different from that which is disclosed explicitly in reference to the presented use cases. In particular, note that although FIGS. 4-6 depict a single DNS server, embodiments may utilize any number of such servers, and different DNS servers may respond to different resource record requests within the same embodiment.

The messages disclosed in reference to FIGS. 4-6 may be formed and sent according to the DNS protocol, e.g., per RFC 1034 and RFC 1035.

FIG. 4 is a schematic diagram depicting a method without parameterization according to some embodiments. For the method of FIG. 4, Alice 401 intends to send an encrypted email using her familiar MUA 402, such as MS Outlook or Apple Mail, to Bob's MUA 405. Bob (or Bob's delegate or email service) has published an SMIMEA record in the DNS that includes a URI directing queries to non-DNS key server 404 managed by Bob's organization, example.com. As depicted in FIG. 4, the record exists at least in DNS server 403 (a DNS name server).

At 406, Alice 401 creates a new email message in her MUA 402, and at 408, Alice 401 enters Bob's email address (bob@example.com) in the "to" field of the email.

At 410, Alice's MUA 402 engages in background processing without further interaction from Alice 401. Specifically, at 410, Alice's MUA 402 sends a query to the DNS, which is received by DNS name server 404, for an SMIMEA record located by <hash-of-bob>._smimecert.example.com.

At 416, DNS server 403 responds with a valid, signed SMIMEA record containing a URI that resembles https://keyserver.example.com:11371/pks/lookup?mail=bob@example.com. (Here and elsewhere, Alice may validate the signature on a response from the DNS server per the DNSSEC/DANE specifications. However, such validation only relates to the DNSSEC trust chain. The extension of the trust chain outside the DNS in embodiments is achieved via the URIVAL record.)

At 418, Alice's MUA 402 sends a query to Bob's organization's key server 404 using the URI provided by the SMIMEA record.

At 420, example.com's key server 404 responds with Bob's certificate, which contains a public key corresponding to Bob's private key. The intent is that Alice's MUA 402 will use Bobs public key in a key establishment protocol, where the established symmetric key is then used to encrypt Alice's email to Bob.

At 422, Alice's MUA 402 sends a query to DNS server 404 for a URIVAL record located by <hash-of-bob>._smimecert.example.com.

At 424, DNS server 403 responds with a valid, signed URIVAL record. Alice's MUA 402 then validates Bob's certificate using the received URIVAL record. (This validation extends the trust chain outside the DNS.)

At 426, Alice 401 sees an indicator in her MUA 402 that a certificate with an encryption key is available for bob@example.com.

At 428, Alice selects "encrypt" in her MUA 402.

At 430, Alice 401 presses "send" to initiate sending her email to Bob.

At 432, Alice's MUA 402 encrypts the email using the public key from Bob's certificate (e.g., in a key establishment protocol to obtain a symmetric key used to encrypt the email) and sends the email using conventional email sending techniques.

Consequently, Bob's MUA 405 receives the email from Alice 401. Bob's MUA 405 uses the symmetric key to decrypt the message. (Some embodiments forego the key establishment protocol and use Bob's public key to encrypt the email directly without the use of a symmetric key.)

FIG. 5 is a schematic diagram depicting a method that utilizes parameterization according to some embodiments. Before describing the specific use case of FIG. 5 in detail, a more general description of parameterization in the context of some embodiments follows.

A parameterized URI is a target URI derived from a base URI and one or more parameters. By parameterizing a single base URI, it is possible to derive multiple target URIs corresponding to different parameter choices. For example, in a secure email application, the base URI could refer to an organization's key server, the parameter could include a user's email address, and the target URI could refer to a public key stored at the key server for that particular user. In some such embodiments, only the base URI would be published as a DNS record. An application, such as an email client, may perform parameterization by combining a base URI with parameters to produce a target URI.

The standard syntax for URIs, as defined in IETF RFC 3986, "Uniform Resource Identifier (URI): Generic Syntax," includes a query field. This field may be used to put the parameters described herein when deriving the target URI from the base URI. However, the specific parameterization process may vary according to the application, the URI scheme, and/or the non-DNS service. For example, if the base URI already includes a value in its query field, then the parameterization process may specify how that value is to be combined with the other parameters. In addition, when there are multiple parameters, the process may specify how those parameters are to be combined into the query field.

It is also possible that parameters could be carried in the path or fragment field of the URI, or some combination of fields. If the parameterization process may change over time, then an indicator of the parameterization process to be applied—e.g., a version number—may be published along with the base URI.

A base URI itself need not refer to an actual object. Only the target URIs derived from a base URI are intended to refer to actual objects. In other words, the base URI that is parameterized into such target URIs may serve as the URI for a non-DNS service, although the base URI itself does not refer to an actual object.

The base URI does not need to be published in the DNS verbatim, but only information sufficient to construct the target URIs from the parameters. For example, if the URI scheme will always be "http:" in some application, then the information published in the DNS does not need to include the scheme name. The base URI information could be compressed or represented in other ways.

Parameterizing a base URI with parameters may result in a target URI that includes in its string of characters an FQDN. However, depending on the application and the non-DNS service, the FQDN may not need to be included verbatim in the target URI. For example, if an organization's domain name is already encoded into the base URI's path field, then only the additional labels in the FQDN that are not in the organization's domain name—the "relative" domain name—may be added.

It is also possible that information other than a domain name could be included in the parameters and combined with a base URI to produce a target URI, such as the rest of the DNS record request or query string, DNS protocol extension fields, and context about the application that is requesting the information from the non-DNS service. As one example, if the non-DNS service is access controlled, the parameters could include authorization information or an API key for the requester's access to the non-DNS service.

In the secure email use case, the domain name itself may be a derived value containing the SHA224 hash of the user's email address. Rather than including the SHA224 hash in the target URI, the parameterization process may instead include a different encoding of the underlying email address, if that better matches the URI syntax for the organization's key server.

Returning to FIG. 5, which depicts a specific use case that utilizes parameterization as described above, Alice 501 intends to send an encrypted email to Bob's MUA 505 using her familiar MUA 502 (such as MS Outlook or Apple Mail). Bob's organization, example.com, has published in DNS server 503 a URI record corresponding to its key server 504 for the example.com zone, but not for individual email users like Bob. The organization has also published a corresponding URIVAL record.

At 506, Alice 501 creates a new email message in her MUA 502, and at 508, Alice 501 enters Bob's email address (bob@example.com) in the "to" field.

At 510, Alice's MUA 502 engages in background processing without further interaction from Alice. In particular, at 510, Alice's MUA 502 sends a query to DNS server 503 for an SMIMEA record located by <hash-of-bob>._smimecert.example.com.

At 512, DNS server 503 responds that the request is for a non-existent domain (NXD). (Alternatively, the domain may exist, but have no records of type SMIMEA. In this example logic, the condition that leads to the next step is the non-existence of the records of interest, not necessarily of the domain per se.)

At 514, moving to the parent domain per its resolution logic (described herein), Alice's MUA 502 sends a query to DNS server 503 for an SMIMEA record located by _smimecert.example.com. (An alternative to this approach is to leverage a wild-card domain, sending a query formed according to, e.g., *._smimecert.example.com. IN URI ( . . . ).)

At 516, DNS server 503 responds with a valid, signed SMIMEA record containing a URI that resembles https://keyserver.example.com:11371/pks/lookup?fqdn=.

At 518, Alice's MUA 502 uses parameterization as described above to derive a target URI from the base URI provided by the SMIMEA and the FQDN: https://keyserver.example.com:11371/pks/lookup?fqdn=<hash-of-bob>._smimecert.example.com. Further at 518, Alice's MUA 502 sends a query to example.com's key server using the target URI.

At 520, example.com's key server 504 responds with Bob's certificate. This process is essentially as described above in reference to FIG. 4.

At 522, Alice's MUA 502 sends a query to the DNS for a URIVAL record located by _smimecert.example.com, and at 524, DNS server 503 responds with a valid, signed URIVAL record. Alice's MUA 502 then validates Bob's certificate using the URIVAL record. The validation of Bob's certificate (containing Bob's public key) using the URIVAL record may proceed as described in connection with FIG. 4.

At 526, Alice 501 sees an indicator in her MUA 502 that an encryption key is available for bob@example.com.

At 528, Alice selects "encrypt" in her MUA 502.

At 530, Alice 501 activates "send" to initiate sending her email to Bob.

Consequently, Alice's MUA 502 encrypts the email using the public key from Bob's certificate (e.g., as described above in reference to FIG. 4) and sends the email using conventional email sending techniques. Bob's MUA 505 receives the email from Alice 501, and decrypts it as described above in reference to FIG. 4.

Note that although the method of FIG. 5 uses parameterization, parameterization is not required by all embodiments. Indeed, the methods of FIGS. 4 and 6 do not utilize parameterization. In general, a resource owner may publish a target URI (or information sufficient to determine one) in a DNS record, such that the target URI is directly employed to look up an associated object. A URI may be accompanied by additional information indicating whether or not it can be parameterized, and if so, how to parameterize it. Whether or not the non-DNS service's URI is intended to be parameterized, the URI may be compressed, hashed, or represented in ways other than a verbatim URI.

Further, in general, a URI may be published in its own DNS record, or as a field of another DNS record (e.g., in a modified version of TLSA or SMIMEA). The URI record or another record containing a URI may be published at various domain names, depending on the application. The specific name given to the resource record for a URI is not essential to the invention.

FIG. 6 is a schematic diagram depicting a method with multiple concurrent URIVAL records according to some embodiments. Alice 601 intends to send an encrypted email to Bob's MUA 605 using her own MUA 602. Bob has published an SMIMEA record in the DNS (so that it is present at least at DNS server 603) that includes a URI directing queries to a non-DNS key server 604 managed by Bob's organization, example.com. The organizational policy calls for different certificates depending on the peer with whom the mail user is corresponding, therefore, multiple URIVAL records have been published to the DNS, which correspond to distinct responses from the example.com key server.

At 606, Alice 601 creates a new email message in her MUA, and at 608 Alice 601 enters Bob's email address (bob@example.com) in the "to" field.

Alice's MUA 602 then engages in background processing without further interaction from Alice. Specifically, at 610, Alice's MUA 602 sends a query to DNS server 603 for an SMIMEA record located by <hash-of-bob>._smimecert.example.com.

At 616, DNS server 603 responds with a valid, signed SMIMEA record containing a URI that resembles https://keyserver.example.com:11371/pks/lookup?mail=bob@example.com.

At 618, Alice's MUA 602 sends a query to Bob's organization's key server 604 using the URI provided by the SMIMEA record.

At 620, example.com's key server 604 examines the source of the query (e.g., Alice's identity or an IP address of Alice's computer) and selects a certificate of Bob's appropriate for correspondence with Alice. Further at 620, example.com's key server 604 responds with the selected certificate.

At 622, Alice's MUA 602 sends a query to DNS server 603 for a URIVAL record located by <hash-of-bob>._smimecert.example.com.

At 624, DNS server 603 responds with a record set that includes multiple valid, signed URIVAL records. In general, there may be multiple URIVAL records located via the same domain name. This makes it possible to leverage different trust chains for different objects, or even the same object at different times or for different uses.

Alice's MUA 602 then iterates through the set of received URIVAL records in order to identify the one that matches the certificate returned by key server 604. Alice's MUA 602 subsequently validates Bob's certificate using the matching URIVAL record.

(Note that some embodiments utilize resolution logic to obtain URIVAL records. Thus, at 624, DNS server 603 may respond that no such URIVAL record exists for <hash-of-bob>._smimecert.example.com, and the resolution logic may direct a subsequent URIVAL query to, e.g., _simemcert.example.com. Other URIVAL resolution schemes are explicitly contemplated, e.g., URIVAL records may be published in a parent domain, alongside the domain at issue, or in another related domain, such as urival.example.com. In general, resolution logic for URIVAL records may proceed as described in reference to resolution logic for URI records, except that parameterization may not be applicable.)

At 626, Alice 601 sees an indicator in her MUA 602 that an encryption key is available for bob@example.com.

At 628, Alice selects "encrypt" in her MUA 602, and at 630, Alice 601 presses "send" to initiate sending her email to Bob.

Consequently, Alice's MUA 602 encrypts the email using the public key from Bob's certificate (e.g., as described above in reference to FIGS. 4 and 5) and sends the email using conventional email sending techniques. Bob's MUA 605 receives the email from Alice 601, and decrypts it as described above.

Note that in a scenario similar to that depicted in reference to FIG. 5, multiple URIVAL records could also be published alongside the SMIMEA record at the parent domain. The plurality of URIVAL records could support different certificates for individual users, as in the use case of FIG. 6 here, as well as different certificates for different users.

Note that some embodiments proceed as described above in reference to FIG. 6, except that at 624, DNS server 603 selects the matching URIVAL record instead of sending a plurality of records and relying on Alice's MUA 602 to select the correct one. DNS server 603 may make the selection based on information representing Bob's certificate as sent in the query of 622.

V. Variations and Other Considerations

According to some embodiments, URI and URIVAL records (or other records containing this information) may include or be accompanied by policy information indicating how the URI or URIVAL record is to be applied. Examples of policy information include the following. A policy may define the domain scope of a record, that is, which zones, sub-domains and/or other domains it covers. A policy may define exclusions for a record, e.g., whether zones, sub-domains and/or other domains within its scope can supersede the record. A policy may define an object scope for a record, e.g., which types of objects the record covers. For example, in a secure email use case, there may be different URI and URIVAL records for encryption keys than for signature keys. A policy may define validity periods for signatures or objects to which a URIVAL record may be applied.

According to some embodiments, object signatures may be used in a variety of ways. For example, the object returned by a non-DNS service may be accompanied by a digital signature in a variety of formats, such as Cryptographic Message Syntax (CMS) or the Javascript Object Signing and Encryption (JOSE). The signature information may also include public keys and/or digital certificates, or references to them, depending on the format. According to some embodiments, the object returned by a non-DNS service could also be in the form of a DNS record and accompanied by a resource record signature (RRSIG) record and possibly one or more DNSKEY records, to increase compatibility with existing DNSSEC implementations. Further, according to some embodiments, the object returned may also include the base URI, the target URI, the domain name, other information from the DNS query, other parameters, and/or other information about the DNS service or the non-DNS service, to strengthen the link between the DNS and the non-DNS service, and with the application.

Some embodiments utilize public ledgers and blockchains. For example, the object and/or its related public keys or digital certificates may be authenticated via publication in a public ledger such as a blockchain in addition to, or in the alternative to the authentication techniques disclosed herein. Information published in a public ledger may be identified by its hash value. A relying party can look up the information from the public ledger by specifying the hash value, and validate that the information so obtained is correct by comparing the received information's hash value to the specified value. This provides a convenient way for a relying party to obtain public keys or certificates that are referenced in a URIVAL field, and/or in a response from the non-DNS service. It is also a possible way to obtain the object itself. Rather than a URI pointing to a non-DNS service that returns the object, the pointer could be a reference to an object published in the public ledger.

Some embodiments provide further extensions, originations, or destinations of the trust chain. According to some embodiments, the disclosed techniques may be applied to the case where the non-DNS service itself points to another non-DNS service. For example, the target URI could point to an object that itself contains a URI pointing to another object. The trust chain could be extended another link by including validation information with the first object, and attaching authentication information to the second object. The process could continue to third objects and beyond through further extensions of the trust chain. The trust chain could also be continued back into the DNS, by employing the "dns:" or a similar scheme for the URI within the target object. Although some embodiments are described as a way of extending the DNS trust chain, which starts at the DNSSEC root, embodiments could also be applied to trust chains starting at other trust anchors within the DNS. The extensions could likewise start at a trust anchor outside the DNS.

In some embodiments, an object returned by a non-DNS service may be signed by that service using the key pair whose public key is available in the DNS; that is, such a non-DNS object may be validated using a key available through DNS.

Certain embodiments can be performed as a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of providing data, the method comprising:
   receiving at a first Domain Name System (DNS) server, over an electronic computer network, a first DNS resource record request from a client computer, wherein the first DNS resource record request comprises a first domain name;
   providing, by the first DNS server to the client computer and in response to the first DNS resource record request, a first DNS resource record comprising a URI for a first non-DNS service;
   whereby the client computer derives a target URI from the URI for the first non-DNS service, contacts a second non-DNS service at the target URI for requested data, and receives the requested data from the second non-DNS service;
   receiving, at a second DNS server, over the electronic computer network, a second DNS resource record request from the client computer, the second DNS resource record request comprising a second domain name;
   providing, by the second DNS server to the client computer and in response to the second DNS resource record request, a second DNS resource record comprising cryptographic authentication information corresponding to the second domain name;
   whereby the client computer cryptographically validates the requested data using the cryptographic authentication information;
   receiving at a third DNS server, prior to the receiving at the first DNS server, over the electronic computer network, a third DNS resource record request from the client computer, the third DNS resource record request comprising a third domain name; and
   replying to the client computer that the third DNS resource record request corresponds to a non-existent record,
   whereby resolution logic consequently directs the client computer to send the first DNS resource record request.

2. The method of claim 1, wherein the third DNS server is the first DNS server.

3. The method of claim 1, wherein the second DNS server is the third DNS server.

4. The method of claim 1, wherein the second DNS server is the first DNS server.

5. The method of claim 1, wherein the cryptographic authentication information comprises a public key of an asymmetric cryptographic key pair, wherein the requested data is signed by a private key of the cryptographic key pair.

6. The method of claim 5, wherein the cryptographic authentication information further comprises a digital certificate comprising the public key.

7. The method of claim 1, wherein the cryptographic authentication information comprises a digital certificate in a trust chain that includes a public key of an asymmetric cryptographic key pair, wherein the requested data is signed by a private key of the cryptographic key pair.

8. The method of claim 1,
   wherein the requested data is signed by a private key of an asymmetric cryptographic key pair comprising a public key, and
   wherein the cryptographic authentication information comprises a cryptographic hash of at least one of: the public key, a digital certificate comprising the public key, or a digital certificate in a trust chain that includes the public key.

9. The method of claim 1, wherein the cryptographic authentication information comprises a cryptographic hash of the requested data.

10. The method of claim 1,
    wherein the second non-DNS service obtains an identifier corresponding to a user of the client computer,
    whereby the second non-DNS service selects the requested data based at least in part on the identifier corresponding to the user of the client computer.

11. The method of claim 1,
    wherein the second DNS resource record is one of a plurality of DNS resource records provided by the by the second DNS server to the client computer in response to the second DNS resource record request;
    whereby the client computer selects the second DNS resource record from the plurality of DNS resource records based on at least one of the requested data or an identifier corresponding to a user of the client computer.

12. The method of claim 1, further comprising:
    selecting, by the second DNS server, the second DNS resource record from a plurality of DNS resource records based on at least one of the requested data or an identifier corresponding to a user of the client computer.

13. A system for providing data, the system comprising:
a first Domain Name System (DNS) server comprising a network interface and configured to:
   receive, over an electronic computer network, a first DNS resource record request from the client computer, wherein the first DNS resource record request comprises a first domain name; and
   provide, to the client computer and in response to the first DNS resource record request, a first DNS resource record comprising a URI for a first non-DNS service;
   whereby the client computer derives a target URI from the URI for the first non-DNS service, contacts a second non-DNS service at the target URI for requested data, and receives the requested data from the second non-DNS service;
a second DNS server comprising a network interface and communicatively coupled to the first DNS server, the second DNS server configured to:
   receive, over the electronic computer network, a second DNS resource record request from the client computer, the second DNS resource record request comprising a second domain name; and
   provide, to the client computer and in response to the second DNS resource record request, a second DNS resource record comprising cryptographic authentication information corresponding to the second domain name;
   whereby the client computer cryptographically validates the requested data using the cryptographic authentication information; and
a third DNS server configured to:
   receive, prior to the first DNS server receiving the first resource record request, over the electronic computer network, a third DNS resource record request from the client computer, the third DNS resource record request comprising a third domain name;
   determine that the third DNS resource record request corresponds to a non-existent record; and
   reply to the client computer that the third DNS resource record request corresponds to a non-existent record,
   whereby resolution logic consequently directs the client computer to send the first DNS resource record request.

14. The system of claim 13, wherein the third DNS server is the first DNS server.

15. The system of claim 13, wherein the second DNS server is the third DNS server.

16. The system of claim 13, wherein the second DNS server is the first DNS server.

17. The system of claim 13, wherein the cryptographic authentication information comprises a public key of an asymmetric cryptographic key pair, wherein the requested data is signed by a private key of the cryptographic key pair.

18. The system of claim 17, wherein the cryptographic authentication information further comprises a digital certificate comprising the public key.

19. The system of claim 13, wherein the cryptographic authentication information comprises a digital certificate in a trust chain that includes a public key of an asymmetric cryptographic key pair, wherein the requested data is signed by a private key of the cryptographic key pair.

20. The system of claim 13, wherein the cryptographic authentication information comprises a cryptographic hash of the requested data.

21. The system of claim 13,
wherein the second non-DNS service obtains an identifier corresponding to a user of the client computer,
whereby the second non-DNS service selects the requested data based at least in part on the identifier corresponding to the user of the client computer.

22. The system of claim 13,
wherein the second DNS server is configured to provide a plurality of DNS resource records comprising the second DNS resource record to the client computer in response to the second DNS resource record request;
whereby the client computer selects the second DNS resource record from the plurality of DNS resource records based on at least one of the requested data or an identifier corresponding to a user of the client computer.

23. The system of claim 13, wherein the second DNS server is configured to select the second DNS resource record from a plurality of DNS resource records based on at least one of the requested data or an identifier corresponding to a user of the client computer.

24. The system of claim 13,
wherein the requested data is signed by a private key of an asymmetric cryptographic key pair comprising a public key, and
wherein the cryptographic authentication information comprises a cryptographic hash of at least one of: the public key, a digital certificate comprising the public key, or a digital certificate in a trust chain that includes the public key.

25. A method of obtaining data, the method comprising:
sending, from a client computer and over an electronic computer network, a first Domain Name System (DNS) resource record request to a first DNS server, wherein the first DNS resource record request comprises a first domain name;
receiving, by the client computer, a first DNS resource record sent from the first DNS server in response to the first DNS resource record request, the first DNS resource record comprising a URI for a non-DNS service;
deriving, by the client computer, a target URI from the URI for the non-DNS service;
contacting, by the client computer and over the electronic computer network, the non-DNS service at the target URI for requested data;
receiving, by the client computer and over the electronic computer network, the requested data from the non-DNS service;
sending, by the client computer and over the electronic network, a second DNS resource record request to a second DNS server, the second DNS resource record request comprising a second domain name;
receiving, by the client computer, a second DNS resource record sent from the second DNS server in response to the second DNS resource record request, the second DNS resource record comprising cryptographic authentication information corresponding to the second domain name;
cryptographically validating the requested data using the cryptographic authentication information;
sending, prior to the sending the first DNS resource record request, from the client computer and over the electronic computer network, a third DNS resource record request to a third DNS server, the third DNS resource record request comprising a third domain name; and receiving, by the client computer, an indication sent by the third DNS server that the third resource record request corresponds to a non-existent record, wherein resolution logic consequently directs the client computer to perform the sending the first DNS resource record request.

26. The method of claim 25, wherein the third DNS server is the first DNS server.

27. The method of claim 25, wherein the second DNS server is the third DNS server.

28. The method of claim 25, wherein the second DNS server is the first DNS server.

29. The method of claim 25, wherein the cryptographic authentication information comprises a public key of an asymmetric cryptographic key pair, wherein the requested data is signed by a private key of the cryptographic key pair.

30. The method of claim 29, wherein the cryptographic authentication information further comprises a digital certificate comprising the public key.

31. The method of claim 25, wherein the cryptographic authentication information comprises a digital certificate in a trust chain that includes a public key of an asymmetric cryptographic key pair, wherein the requested data is signed by a private key of the cryptographic key pair.

32. The method of claim 25,
wherein the requested data is signed by a private key of an asymmetric cryptographic key pair comprising a public key, and
wherein the cryptographic authentication information comprises a cryptographic hash of at least one of: the public key, a digital certificate comprising the public key, or a digital certificate in a trust chain that includes the public key.

33. The method of claim 25, wherein the cryptographic authentication information comprises a cryptographic hash of the requested data.

34. The method of claim 25,
wherein the contacting the non-DNS service comprises sending an identifier corresponding to a user of the client computer,
whereby the non-DNS service selects the requested data based at least in part on the identifier corresponding to the user of the client computer.

35. The method of claim 25, wherein the second DNS resource record is one of a plurality of DNS resource records provided by the by the second DNS server to the client computer in response to the second DNS resource record request, the method further comprising:
selecting, by the client computer, the second DNS resource record from the plurality of DNS resource records based on at least one of the requested data or an identifier corresponding to a user of the client computer.

36. The method of claim 25,
wherein the sending a second DNS resource record request comprises sending an identifier corresponding to a user of the client computer;
whereby the second DNS server selects the second DNS resource record from a plurality of DNS resource records based on at least one of the requested data or the identifier corresponding to the user of the client computer.

37. The method of claim 25, wherein the deriving comprises using the URI for the non-DNS service as the target URI.

38. A non-transitory computer readable medium comprising computer-interpretable instructions, which, when executed by at least one electronic processor of a client computer, configure the at least one electronic processor to perform a method comprising:
sending, from the client computer and over an electronic computer network, a first Domain Name System (DNS) resource record request to a first DNS server, wherein the first DNS resource record request comprises a first domain name;
receiving, by the client computer, a first DNS resource record sent from the first DNS server in response to the first DNS resource record request, the first DNS resource record comprising a URI for a non-DNS service;
deriving, by the client computer, a target URI from the URI for the non-DNS service;
contacting, by the client computer and over the electronic computer network, the non-DNS service at the target URI for requested data;
receiving, by the client computer and over the electronic computer network, the requested data from the non-DNS service;
sending, by the client computer and over the electronic network, a second DNS resource record request to a second DNS server, the second DNS resource record request comprising a second domain name;
receiving, by the client computer, a second DNS resource record sent from the second DNS server in response to the second DNS resource record request, the second DNS resource record comprising cryptographic authentication information corresponding to the second domain name;
cryptographically validating the requested data using the cryptographic authentication information;
sending, prior to the sending the first DNS resource record request, from the client computer and over the electronic computer network, a third DNS resource record request to a third DNS server, the third DNS resource record request comprising a third domain name; and
receiving, by the client computer, an indication sent by the third DNS server that the third resource record request corresponds to a non-existent record, wherein resolution logic consequently directs the client computer to perform the sending the first DNS resource record request.

39. The non-transitory computer readable medium of claim 38, wherein the third DNS server is the first DNS server.

40. The non-transitory computer readable medium of claim 38, wherein the second DNS server is the third DNS server.

41. The non-transitory computer readable medium of claim 38, wherein the second DNS server is the first DNS server.

42. The non-transitory computer readable medium of claim 38, wherein the cryptographic authentication information comprises a public key of an asymmetric cryptographic key pair, wherein the requested data is signed by a private key of the cryptographic key pair.

43. The non-transitory computer readable medium of claim 38, wherein the cryptographic authentication information further comprises a digital certificate comprising the public key.

44. The non-transitory computer readable medium of claim 38, wherein the cryptographic authentication information comprises a digital certificate in a trust chain that includes a public key of an asymmetric cryptographic key pair, wherein the requested data is signed by a private key of the cryptographic key pair.

45. The non-transitory computer readable medium of claim 38,
    wherein the requested data is signed by a private key of an asymmetric cryptographic key pair comprising a public key, and
    wherein the cryptographic authentication information comprises a cryptographic hash of at least one of: the public key, a digital certificate comprising the public key, or a digital certificate in a trust chain that includes the public key.

46. The non-transitory computer readable medium of claim 38, wherein the cryptographic authentication information comprises a cryptographic hash of the requested data.

47. The non-transitory computer readable medium of claim 38,
    wherein the contacting the non-DNS service comprises sending an identifier corresponding to a user of the client computer,
    whereby the non-DNS service selects the requested data based at least in part on the identifier corresponding to the user of the client computer.

48. The non-transitory computer readable medium of claim 38,
    wherein the second DNS resource record is one of a plurality of DNS resource records provided by the by the second DNS server to the client computer in response to the second DNS resource record request,
    the non-transitory computer readable medium further comprising computer-interpretable instructions, which, when executed by the at least one electronic processor of the client computer, further configure the at least one electronic processor to select the second DNS resource record from the plurality of DNS resource records based on at least one of the requested data or an identifier corresponding to a user of the client computer.

49. The non-transitory computer readable medium of claim 38,
    wherein the sending a second DNS resource record request comprises sending an identifier corresponding to a user of the client computer;
    whereby the second DNS server selects the second DNS resource record from a plurality of DNS resource records based on at least one of the requested data or the identifier corresponding to the user of the client computer.

50. The non-transitory computer readable medium of claim 38, wherein the deriving comprises using the URI for the non-DNS service as the target URI.

* * * * *